(12) United States Patent
Iwasaki

(10) Patent No.: US 6,888,812 B1
(45) Date of Patent: May 3, 2005

(54) CDMA RECEIVER

(75) Inventor: Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/505,662

(22) Filed: Feb. 17, 2000

(30) Foreign Application Priority Data

Feb. 19, 1999 (JP) .......................................... 11-041427

(51) Int. Cl.[7] .............................................. H04B 7/216
(52) U.S. Cl. ........................ 370/342; 370/335; 370/320
(58) Field of Search ................................ 370/320, 335, 370/342, 441; 375/142, 143, 145, 148, 149, 150

(56) References Cited

U.S. PATENT DOCUMENTS

| 5,305,349 | A | * | 4/1994 | Dent | ........................ 370/209 |
| 5,644,592 | A | * | 7/1997 | Divsalar et al. | ............ 375/147 |
| 5,835,527 | A | | 11/1998 | Lomp | |
| 6,064,338 | A | * | 5/2000 | Kobayakawa et al. | ...... 342/378 |
| 6,507,604 | B1 | * | 1/2003 | Kuo | ............................. 375/148 |

FOREIGN PATENT DOCUMENTS

| JP | 5-292059 | 11/1993 |
| JP | 5-292063 | 11/1993 |
| JP | 9-74372 | 3/1997 |
| JP | 9-181704 | 7/1997 |
| JP | 10-200503 | 7/1998 |

OTHER PUBLICATIONS

A.L. Viterbi, "CDMA–Principles of Spread Spectrum Communication", Addison–Wesley Publishing Company, pp. 89–92.

Patent Abstracts of Japan vol. 1997, No. 11, Nov. 28, 1997 (corresponds to JPA No. 9–181704, published Jul. 11, 1997).

* cited by examiner

Primary Examiner—Steven Nguyen
Assistant Examiner—Thien Tran
(74) Attorney, Agent, or Firm—Sughrue Mion, PLLC

(57) ABSTRACT

A receiver for use in a CDMA communication system, which is designed for a small size, has a plurality of delay units for adding delays over transmission paths to a complex conjugate value of a spreading code, a plurality of multipliers for multiplying the delayed signals outputted from the delay units by complex conjugate values of coefficients representing respective phase/amplitude ratios of the transmission paths, and an adder for adding the product signals outputted from the multiplier, and a despreader for despreading a reception signal using the sum signal outputted from the adder.

7 Claims, 4 Drawing Sheets

CDMA RECEIVER

BACKGROUND OF THE INVENTION

1. Field of the Invention

The present invention relates to a receiver, and more particularly to a receiver for use in a CDMA (Code Division Multiplex Access) communication system.

2. Description of the Related Art

Receivers for use in broadband CDMA communication systems which are expected to be next-generation portable telephone system standards should comprise RAKE receivers for removing multipath fading interference.

In a CDMA communication system, as shown in FIG. 1 of the accompanying drawings, multiplier 102 in transmitter 101 spreads transmission data x(t) by multiplying it by spreading code c(t), and the transmitter 101 transmits the spread data as transmission signal s(t).

The transmission signal s(t) transmitted from the transmitter 101 is subjected to multipath fading over a plurality of transmission paths 103-1 through 103-N with respective delays $\tau_1$–$\tau_N$. Thereafter, the signal is received as a reception signal r(t) by a RAKE receiver 104.

Specifically, over the respective transmission paths 103-1–103-N, the transmission signal s(t) is given the respective delays $\tau_1$–$\tau_N$, and the results are multiplied by respective coefficients $a_1$–$a_N$ representing respective phase/amplitude ratios of the transmission paths. The signals from the transmission paths 103-1 through 103-N are then added together, producing the reception signal r(t).

As shown in FIG. 2 of the accompanying drawings, the RAKE receiver 104 has a plurality of fingers comprising a plurality of delay units 110-1–110-N for giving delays $\tau_1$–$\tau_N$ depending on the respective transmission paths to the reception signal r(t), a plurality of multipliers 120-1–120-N for multiplying signals which are produced by delaying the reception signal r(t) for the delays $\tau_1$–$\tau_N$ with the delay units 110-1–110-N, by a complex conjugate value c(t)* of c(t), and outputting product signals, a plurality of integrators 130-1–130-N for integrating the product signals from the multipliers 120-1–120-N for the period of one symbol, and outputting integrals $f_{1,n}$–$f_{N,n}$, respectively, a plurality of multipliers 140-1–140-N for multiplying the integrals $f_{1,n}$–$f_{N,n}$ outputted from the integrators 130-1–130-N by complex conjugate values $a_1^*$–$a_N^*$ of the respective coefficients $a_1$–$a_N$, and outputting product signals, and an adder 150 for adding the product signals from the multipliers 140-1–140-N and outputting the sum as an output signal series Rn. The reception signal r(t) should ideally be branched into as many as signals as the number of transmission paths, but may not be so branched because of limitations on the circuit scale.

Multiplying the integrals $f_{1,n}$–$f_{N,n}$ outputted from the integrators 130-1–130-N by the complex conjugate values $a_1^*$–$a_N^*$ with the multipliers 140-1–140-N is equivalent to correcting carrier phase differences caused between the transmission paths over the transmission paths and weighting the signals depending on amplitude differences between the transmission paths. Therefore, when the signals outputted from the multipliers 140-1-140-N are added by the adder 150, their vectors can be combined for a maximum S/N ratio.

A process of transmitting and receiving data in the above CDMA communication system will be described below in specific detail with reference to FIGS. 1 and 2.

The transmission signal s(t) transmitted from the transmitter is produced by multiplying the transmission data x(t) by the spreading code c(t), as shown by the following equation (1):

$$S(t)=c(t) \times (t) \tag{1}$$

The transmission data x(t) is represented by a signal where the value of a transmission data series $x_n$ continues for a symbol interval T, as shown by the following equation (2):

$$x(t)=x_n \ldots nT \leq t<(n+1)T \tag{2}$$

The reception signal r(t) which has been subjected to multipath fading is produced by giving the respective delays $\tau_i$ of the transmission paths to the transmission signal s(t), multiplying the results by the respective coefficients $a_i$ representing phase/amplitude ratios of the respective transmission paths, and adding the signals from all the transmission paths, producing the reception signal r(t), as shown by the following equation (3):

$$r(t) = \sum_{i=1}^{N} a_i s(t-\tau_i) = \sum_{i=1}^{N} a_i c(t-\tau_i) x(t-\tau_i) \tag{3}$$

In the fingers of the receiver, the delay units 110-1–110-N give the reception signal r(t) the delay times $\tau_i$ of the transmission paths, as shown by the equation (4) below. Then, the multipliers 120-1–120-N multiplies the signals from the delay units 110-1–110-N by the complex conjugate value c(t)* of the spreading code. Thereafter, the integrators 130-1–130-N integrate the product signals from the multipliers 120-1–120-N for the period of one symbol, producing integrals $f_{j,n}$. As shown by the equation (5) below, the integrals $f_{j,n}$ outputted from the integrators 130-1–130-N are represented by the sum of the products of the transmission data series $x_n$ and the phase/amplitude ratios of the transmission paths, and interferences $I_{j,n}$ composed of signal components from other transmission paths having different delay times.

$$f_{jn} = \int_{nT}^{(n+1)T} r(t+\tau_j)c*(t)dt = \int_{nT}^{(n+1)T} \sum_{i=1}^{N} a_i c(t-\tau_i+\tau_j)x(t-\tau_i+\tau_j)c*(t)dt \tag{4}$$

$$= a_j \int_{nT}^{(n+1)T} x(t)dt + \sum_{i=1}^{i \neq j} a_i \int_{nT}^{(n+1)T} c*(t)c(t-\tau_i+\tau_j)x(t-\tau_i+\tau_j)dt \tag{5}$$

$$= a_j x_n + I_{jn}$$

Then, the multipliers 140-1–140-N multiply the integrals $f_{j,n}$ outputted from the integrators 130-1–130-N by the complex conjugate values $a_j^*$ of the phase/amplitude ratios of the transmission paths. Thereafter, the adder 150 adds the outputs from the fingers together, and outputs the sum as the output signal series Rn, as shown by the equations (6), (7) below. When the multipliers 140-1–140-N multiply the integrals $f_{j,n}$ by the complex conjugate values $a_j^*$ of the phase/amplitude ratios, the phase errors of the respective paths are corrected, and the signals are weighted for a maximum S/N ratio.

$$Rn = \sum_{i=1}^{N} a_i * f_{jn} = \sum_{j=1}^{N} |a_j|^2 x_n + \sum_{j=1}^{N} a_j * I_{jn} \quad (6)$$

$$= x_n \sum_{j=1}^{N} |a_j|^2 + \sum_{j=1}^{N} a_j * I_{jn} \quad (7)$$

The RAKE receiver tends to have a large circuit scale because it needs to have a plurality of despreaders parallel to each other for despreading the reception signal.

However, terminals which have the RAKE receiver are required to have a small circuit scale in view of demands for a low price and power requirements.

If terminals have a large circuit scale due to the incorporation of the RAKE receiver, then the price and power requirements of the terminals cannot be reduced.

SUMMARY OF THE INVENTION

It is therefore an object of the present invention to provide a CDMA receiver which has a relatively small circuit scale, and yet is capable of performing functions equivalent to those of the conventional CDMA receivers.

In a receiver according to the present invention, a plurality of delay means add delays over transmission paths to a complex conjugate value of a spreading code used when a reception signal is transmitted, and output delayed signals. A plurality of multiplying means multiply the delayed signals outputted from the delay means by complex conjugate values of coefficients representing respective phase/amplitude ratios of the transmission paths, and output product signals. An adding means adds the product signals outputted from the multiplying means, and outputs the sum as a code for despreading the reception signal. A despreading means despreads the reception signal using the code outputted from the adding means.

Since the code for despreading the reception signal is calculated on the basis of the delays given to the reception signal over transmission paths and the coefficients representing the respective phase/amplitude ratios of the transmission paths, and the reception signal is despread using the calculated code, it is not necessary to provide as many despreading circuits as the number of the transmission paths. Therefore, the receiver according to the present invention is reduced in circuit scale.

The above and other objects, features, and advantages of the present invention will become apparent from the following descriptions with reference to the accompanying drawings which illustrate examples of the present invention.

DETAILED DESCRIPTION OF THE PREFERRED EMBODIMENT

Figure 1:
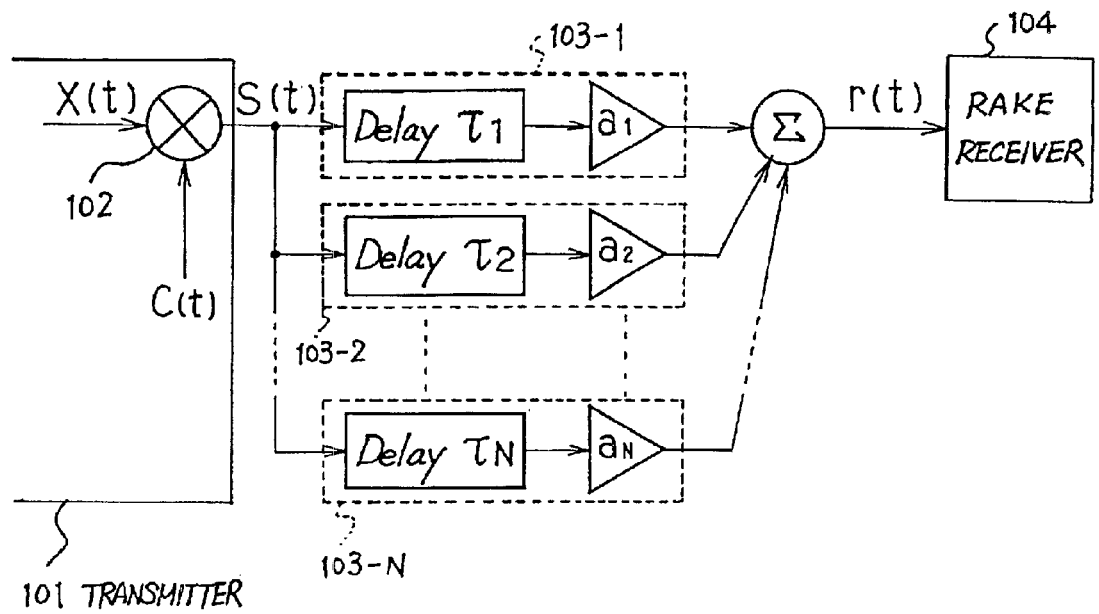
FIG. 1 is a block diagram illustrative of a process of transmitting data in a CDMA communication system.
Figure 2:
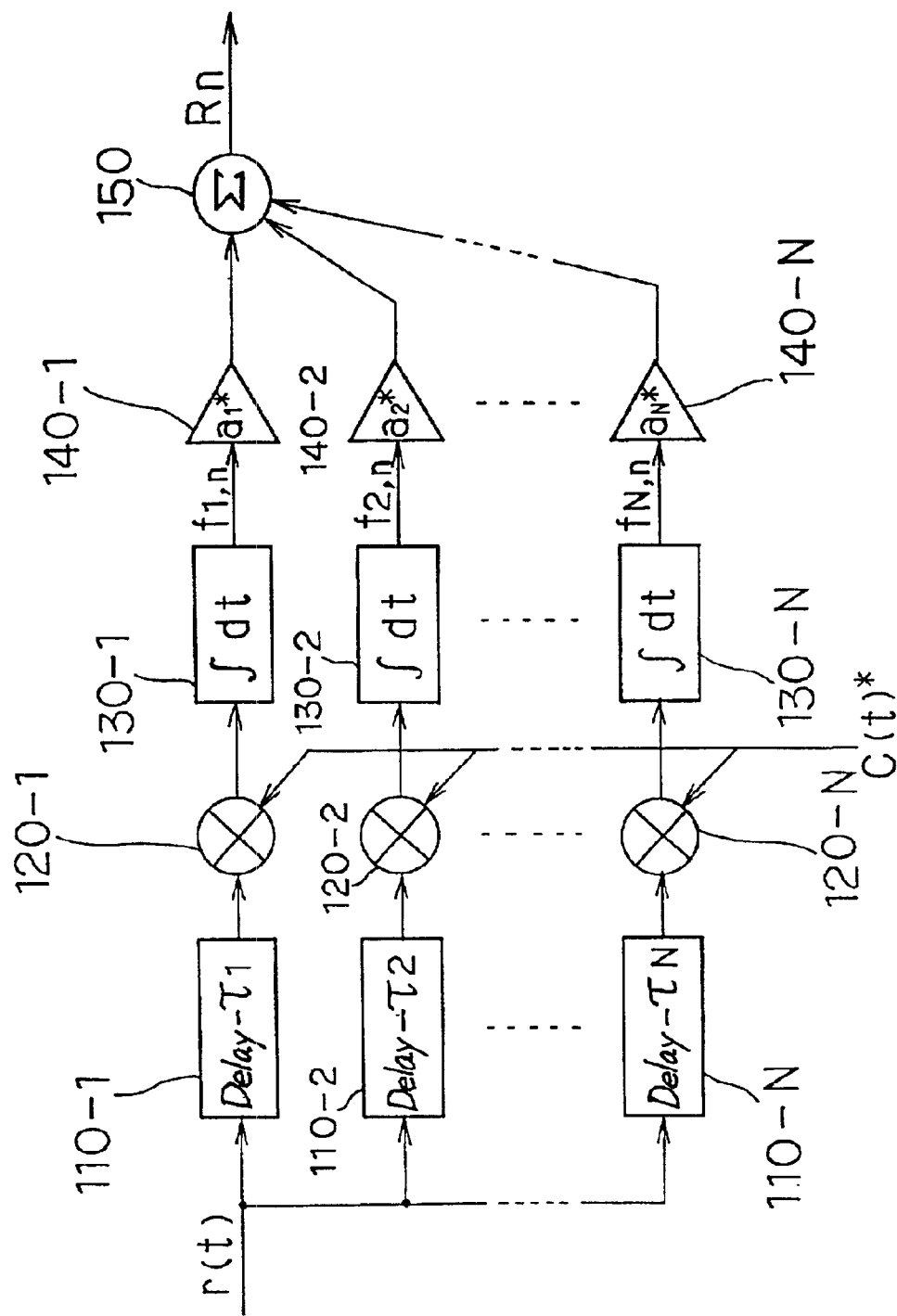
FIG. 2 is a block diagram of a RAKE receiver.
Figure 3:
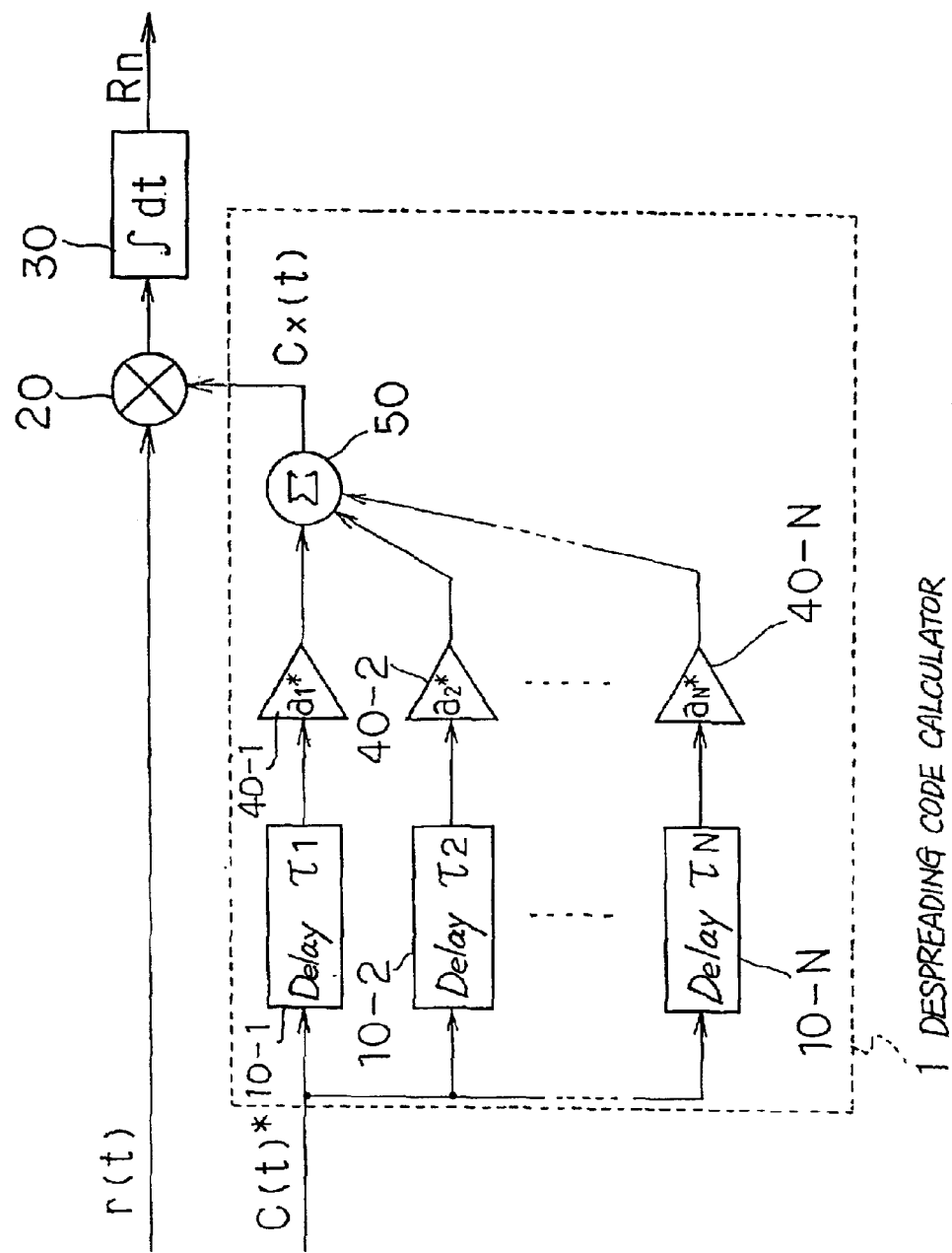
FIG. 3 is a block diagram of a receiver according to an embodiment of the present invention.

As shown in FIG. 3, a receiver according to an embodiment of the present invention comprises a despreading code calculator 1 for calculating a despreading code $c_x(t)$ for despreading a reception signal r(t) based on delays given to the reception signal r(t) over a plurality of transmission paths through which the reception signal r(t) is transmitted and coefficients representing respective phase/amplitude ratios of the transmission paths, a despreader 20 for despreading the reception signal r(t) using the despreading code $c_x(t)$ calculated by the despreading code calculator 1, and an integrator 30 for integrating the reception signal despread by the despreader 20 and outputting the integrated signal as a reception signal series Rn.

The despreading code calculator 1 comprises a plurality of delay units 10-1–10-N for adding delays $\tau_1$–$\tau_N$ over the transmission paths through which the reception signal r(t) is transmitted, to complex conjugate value c(t)* of the spreading code, and outputting delayed signals, a plurality of multipliers 40-1–40-N for multiplying the delayed signals outputted from the delay units 10-1–10-N by complex conjugate values $a_1^*$–$a_N^*$ of coefficients $a_1$–$a_N$ by which the transmission signal has been multiplied, and outputting product signals, and an adder 50 for adding the product signals outputted from the multipliers 40-1–40-N, and outputting the sum as the despreading code cx(t).

In the receiver shown in FIG. 3, the reception signal r(t) is not branched into as many as signals as the number of transmission paths for being delayed and corrected in phase. Instead, the delays $\tau_1$–$\tau_N$ over the transmission paths through which the reception signal r(t) is transmitted are added to the code c(t)* used to despread the reception signal r(t) for delaying and correcting the reception signal r(t) in phase and adding amplitude weights to the reception signal r(t). Thereafter, the delayed signals are multiplied by the complex conjugate values $a_1^*$–$a_N^*$ of the coefficients $a_1$–$a_N$ by which the transmission signal has been multiplied over the respective transmission paths, thereby producing the code $c_x(t)$ for despreading the reception signal r(t).

Using the despreading code $c_x(t)$, the reception signal r(t) is despread into the reception signal series Rn.

The equation (7) referred to above can be modified into the following equations (8)–(11):

$$Rn = \sum_{j=1}^{N} a_j * \int_{nT}^{(n+1)T} r(t+\tau_j) c*(t) dt \quad (8)$$

$$= \sum_{j=1}^{N} a_j * \int_{nT+\tau_1}^{(n+1)T+\tau_j} r(t) c*(t-\tau_1) dt$$

$$= \sum_{j=1}^{N} a_j * \int_{nT}^{(n+1)T+A} r(t) c*(t-\tau_1) dt \quad (9)$$

$$= \int_{nI}^{(n+1)T+A} r(t) \sum_{j=1}^{N} a_1 * c*(t-\tau_1) dt$$

$$= \int_{nT}^{(n+1)T+A} r(t) c_x(t) dt \quad (10)$$

$$c_x(t) \equiv \sum_{j=1}^{N} a_j * c*(t-\tau_1) \quad (11)$$

When the equation (9) is expressed by a block form, the circuit shown in FIG. 3 is achieved.

As described above, rather than despreading the reception signal r(t) into as many signals as the transmission paths and adding the despread signals into the reception signal series Rn, the code c(t)* used to despread the reception signal r(t) is given the delays over the respective transmission paths, the delayed codes are multiplied by the complex conjugate values representing the phase/amplitude ratios of the transmission paths, and the product signals are added into the code $c_x(t)$ for despreading the reception signal. The reception signal $r(t)$ is thereafter despread by the code $c_x(t)$. The receiver according to the embodiment of the present invention can thus comprise a single finger.

Figure 4:
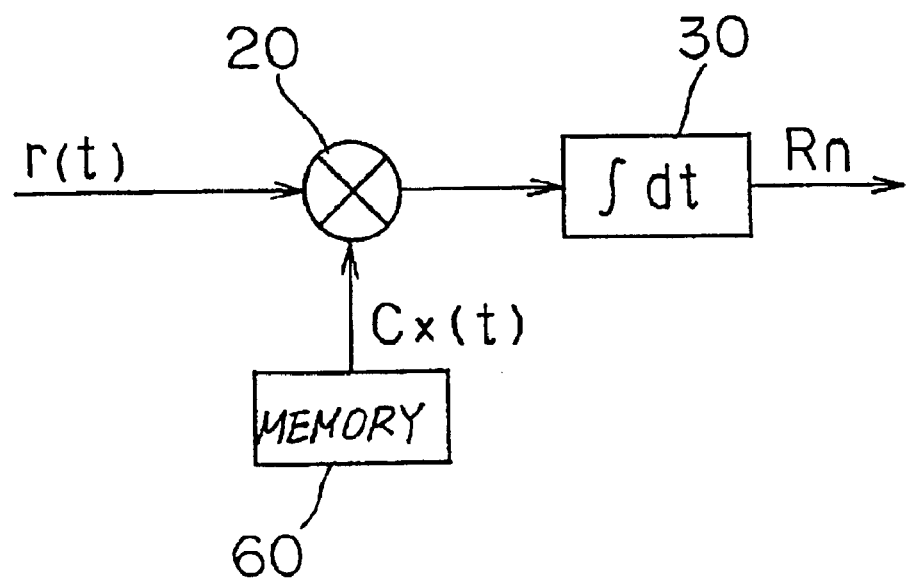
FIG. 4 is a block diagram of a simplified representation of the receiver shown in FIG. 3.

If the despreading code $c_x(t)$ is calculated in advance and stored in a memory 60, as shown in FIG. 4, then the receiver can be constructed of a single despreader only, and hence can be of a highly simplified circuit arrangement.

In the circuit shown in FIG. 4, the despreading code may be calculated and stored as a table if fading parameters (delay times and phase/amplitude ratios) suffer no time-dependent variations or slow time-dependent variations.

While a preferred embodiment of the present invention has been described using specific terms, such description is for illustrative purposes only, and it is to be understood that changes and variations may be made without departing from the spirit or scope of the following claims.

What is claimed is:

1. A receiver comprising:
   despreading code calculating means for calculating a code for despreading a reception signal based on delays given to the reception signal over a plurality of transmission paths through which the reception signal is transmitted and coefficients representing respective phase/amplitude ratios of the transmission paths;
   despreading means for despreading the reception signal using the code calculated by and output directly from said despreading code calculating means; and
   integrating means for integrating the reception signal despread by said despreading means.

2. A receiver comprising:
   memory means for storing a code for despreading a reception signal, calculated in advance based on delays given to the reception signal over a plurality of transmission paths through which the reception signal is transmitted and coefficients representing respective phase/amplitude ratios of the transmission paths;
   despreading means for despreading the reception signal using the code stored by and output directly from said memory means; and
   integrating means for integrating the reception signal despread by said despreading means.

3. A receiver according to claim 1, wherein said despreading code calculating means comprises:
   a plurality of delay means for adding the delays over the transmission paths to a complex conjugate value of a spreading code used when the reception signal is transmitted, and outputting delayed signals; a plurality of multiplying means for multiplying the delayed signals outputted from said delay means by complex conjugate values of the coefficients representing the respective phase/amplitude ratios of the transmission paths, and outputting product signals; and adding means for adding the product signals outputted from said multiplying means, and outputting the sum as the code for despreading the reception signal.

4. A receiver according to claim 1, further comprising memory means for storing the code outputted from said despreading code calculating means, said despreading means comprising means for despreading said reception signal using the code stored by said memory means.

5. A receiver according to claim 3, further comprising memory means for storing the code outputted from said adding means, said despreading means comprising means for despreading said reception signal using the code stored by said memory means.

6. A receiver according to claim 3, wherein there are as many said delay means and said multiplying means as the number of the transmission paths.

7. A receiver according to claim 5, wherein there are as many said delay means and said multiplying means as the number of the transmission paths.

\* \* \* \* \*